United States Patent [19]
Olander et al.

[11] Patent Number: 5,837,027
[45] Date of Patent: Nov. 17, 1998

[54] MANUFACTURING PROCESS FOR GAS SOURCE AND DISPENSING SYSTEMS

[75] Inventors: W. Karl Olander, New Milford; James V. McManus, Danbury, both of Conn.

[73] Assignee: Advanced Technology Materials, Inc., Danbury, Conn.

[21] Appl. No.: 859,171

[22] Filed: May 20, 1997

Related U.S. Application Data

[60] Provisional application Nos. 60/019,025 May 20, 1996, 60/017,973 May 20, 1996, and 60/017,966 May 20, 1996.

[51] Int. Cl.[6] ................................................ B01D 53/04
[52] U.S. Cl. .................. 95/14; 95/17; 95/95; 95/104; 95/106; 95/133; 96/112; 96/130; 96/144
[58] Field of Search ............................... 55/356; 95/14, 95/15, 17, 18, 90, 95, 104, 106, 133; 96/108, 112, 113, 121, 126–128, 130, 133, 144, 146, 150

[56] References Cited

U.S. PATENT DOCUMENTS

| | | | |
|---|---|---|---|
| 3,415,069 | 12/1968 | Hauser | 96/126 X |
| 3,517,521 | 6/1970 | Emerson | 95/106 X |
| 3,626,671 | 12/1971 | Ebeling, Jr. | 96/126 |
| 4,026,680 | 5/1977 | Collins | 96/126 X |
| 4,197,095 | 4/1980 | White, Jr. et al. | 95/15 |
| 4,723,967 | 2/1988 | Tom | 95/90 |
| 4,738,693 | 4/1988 | Tom | 95/90 |
| 4,744,221 | 5/1988 | Knollmueller | 62/48 |
| 4,749,384 | 6/1988 | Nowobilski et al. | 96/108 X |
| 5,518,528 | 5/1996 | Tom et al. | 95/103 |
| 5,520,721 | 5/1996 | Fraysse et al. | 96/126 X |
| 5,624,477 | 4/1997 | Armond | 96/112 X |
| 5,704,965 | 1/1998 | Tom et al. | 95/95 |
| 5,707,424 | 1/1998 | Tom et al. | 95/95 |

*Primary Examiner*—Robert Spitzer
*Attorney, Agent, or Firm*—Steven J. Hultquist; Oliver A. M. Zitzmann

[57] ABSTRACT

A fill system and methodology for the manufacture of fluid storage and dispensing vessels containing sorbent material for holding a sorbable fluid, for on-demand dispensing of the fluid in the use of the vessel. The fill system and methodology are directed to minimizing the processing time required to dissipate the heat of sorption incident to the loading of the sorbable fluid onto the sorbent material, so that thermal equilibration time in the manufacture of the vessels is substantially reduced in relation to the use of only ambient convective air cooling for dissipation of the heat of sorption from the fluid-filled vessel.

18 Claims, 9 Drawing Sheets

MANUFACTURING PROCESS FOR GAS SOURCE AND DISPENSING SYSTEMS

CROSS-REFERENCE TO RELATED APPLICATION

This application is based on and claims the priorities of United States Provisional patent application Ser. No. 60/019,025 filed May 20, 1996, United States Provisional patent application Ser. No. 60/017,966 filed May 20, 1996 and United States Provisional patent application Ser. No. 60/017,973 filed May 20, 1996.

BACKGROUND OF THE INVENTION

1. Field of the Invention

This invention relates generally to storage and dispensing systems for the selective dispensing of fluids from a vessel in which the fluid component(s) are sorptively retained by a solid sorbent medium, and are desorptively released from the sorbent medium in the dispensing operation. More particularly, the invention relates to a manufacturing process for such storage and dispensing systems.

2. Description of the Related Art

In a wide variety of industrial processes and applications, there is a need for a reliable source of process fluid(s) that is compact, portable, and available to supply the fluid(s) on demand. Such processes and applications include semiconductor manufacturing, ion implantation, manufacture of flat panel displays, medical treatment, water treatment, emergency breathing equipment, welding operations, space-based applications involving delivery of liquids and gases, etc.

U.S. Pat. No. 4,744,221 issued May 17, 1988 to Karl O. Knollmueller discloses a method of storing and subsequently delivering arsine, by contacting arsine at a temperature of from about −30° C. to about +30° C. with a zeolite of pore size in the range of from about 5 to about 15 Angstroms to adsorb arsine on the zeolite, and then dispensing the arsine by heating the zeolite to an elevated temperature of up to about 175° C. for sufficient time to release the arsine from the zeolite material.

The method disclosed in the Knollmueller patent is disadvantageous in that it requires the provision of heating means for the zeolite material, which must be constructed and arranged to heat the zeolite to sufficient temperature to desorb the previously sorbed arsine from the zeolite in the desired quantity.

The use of a heating jacket or other means exterior to the vessel holding the arsine-bearing zeolite is problematic in that the vessel typically has a significant heat capacity, and therefore introduces a significant lag time to the dispensing operation. Further, heating of arsine causes it to decompose, resulting in the formation of hydrogen gas, which introduces an explosive hazard into the process system. Additionally, such thermally-mediated decomposition of arsine effects substantial increase in gas pressure in the process system, which may be extremely disadvantageous from the standpoint of system life and operating efficiency.

The provision of interiorly disposed heating coil or other heating elements in the zeolite bed itself is problematic since it is difficult with such means to uniformly heat the zeolite bed to achieve the desired uniformity of arsine gas release.

The use of heated carrier gas streams passed through the bed of zeolite in its containment vessel may overcome the foregoing deficiencies, but the temperatures necessary to achieve the heated carrier gas desorption of arsine may be undesirably high or otherwise unsuitable for the end use of the arsine gas, so that cooling or other treatment is required to condition the dispensed gas for ultimate use.

U.S. Pat. No. 5,518,528 issued May 21, 1996 in the names of Glenn M. Tom and James V. McManus, describes a gas storage and dispensing system, for the storage and dispensing of gases, e.g., hydride gases, halide gases, organometallic Group V compounds, etc. which overcomes various disadvantages of the gas supply process disclosed in the Knollmueller patent.

The gas storage and dispensing system of the Tom et al. patent comprises an adsorption-desorption apparatus, for storage and dispensing of gases, including a storage and dispensing vessel holding a solid-phase physical sorbent, and arranged for selectively flowing gas into and out of the vessel. A sorbate gas is physically adsorbed on the sorbent. A dispensing assembly is coupled in gas flow communication with the storage and dispensing vessel, and provides, exteriorly of the vessel, a pressure below the vessel's interior pressure, to effect desorption of sorbate from the solid-phase physical sorbent medium, and flow of desorbed gas through the dispensing assembly. Heating means may be employed to augment the desorption process, but as mentioned above, heating entails various disadvantages for the sorption/desorption system, and it therefore is preferred to operate the Tom et al. system with the desorption being carried out at least partially by pressure differential-mediated release of the sorbate gas from the sorbent medium.

The storage and dispensing vessel of the Tom et al. patent embodies a substantial advance in the art, relative to the prior art use of high pressure gas cylinders. Conventional high pressure gas cylinders are susceptible to leakage from damaged or malfunctioning regulator assemblies, as well as to rupture and unwanted bulk release of gas from the cylinder if the internal gas pressure in the cylinder exceeds permissible limits. Such overpressure may for example derive from internal decomposition of the gas leading to rapid increasing interior gas pressure in the cylinder.

The gas storage and dispensing vessel of the Tom et al. patent thus reduces the pressure of stored sorbate gases by reversibly adsorbing them onto a carrier sorbent, e.g., a zeolite or activated carbon material.

The manufacture of gas storage and dispensing vessels of the type disclosed in the Tom et al. patent requires an extended period of time. Typical manufacturing (filling) times are on the order of 24 hours.

In the case of arsine and various other hydride gases, the sorbent-containing cylinder is filled to a target pressure on the order of 650 Torr at a selected temperature, e.g., of 25° C. Since the storage and dispensing vessel has a very low heat transfer coefficient, the accompanying heat of adsorption, which is on the order of 15 kilocalories per mole, is slowly released to the ambient surroundings of the storage and dispensing vessel subsequent to its being filled with sorbable fluid. This temperature equilibration process, dissipating the heat of absorption, takes many hours to complete. The $\Delta P/\Delta T$ for a typical storage and dispensing vessel containing zeolite or carbon sorbent materials, at 650 Torr, is on the order of about 35 Torr per °C.

In commercial practice, the aforementioned manufacturing fill operation is carried out using a fixed position fill manifold. Such fill manifold apparatus is expensive, and current cost of such units is on the order of $400,000.00 U.S. or above.

Accordingly, it is an object of the present invention to provide an improved fill manufacturing procedure for preparation of storage and dispensing vessels of the above-described type.

It is another object of the present invention to provide a fill manufacturing process of such type, which achieves greater throughput in the fill operation, in the same or less time as prior practice.

Other objects and advantages of the invention will be more fully apparent from the ensuing disclosure.

SUMMARY OF THE INVETION

The present invention relates to a system for storage and dispensing of a sorbable fluid, comprising a storage and dispensing vessel constructed and arranged to hold a solid-phase physical sorbent medium having a sorptive affinity for the sorbable fluid, and for selectively flowing sorbable fluid into and out of such vessel. A solid-phase physical sorbent medium having a sorptive affinity for the fluid is disposed in the storage and dispensing vessel at an interior gas pressure. The sorbable fluid is physically adsorbed on the sorbent medium. A dispensing assembly is coupled in gas flow communication with the storage and dispensing vessel, and constructed and arranged for selective on-demand dispensing of desorbed fluid, after thermal and/or pressure differential-mediated desorption of the fluid from the carbon sorbent material, with the dispensing assembly being constructed and arranged:

(I) to provide, exteriorly of said storage and dispensing vessel, a pressure below said interior pressure, to effect desorption of fluid from the carbon sorbent material, and flow of desorbed fluid from the vessel through the dispensing assembly; and/or (II) to flow thermally desorbed fluid therethrough, and comprising means for heating the carbon sorbent material to effect desorption of the fluid therefrom, so that the desorbed fluid flows from the vessel into the dispensing assembly.

More specifically, the invention relates to a fill manufacturing process for fabricating a storage and dispensing vessel for a system of the aforementioned type.

Generally, the fill process for introducing a sorbable fluid into a storage and dispensing vessel of the above-described type, containing a suitable sorbent medium having affinity for the sorbable fluid, is composed of three (3) distinct steps: (1) bulk fill of the sorbable fluid, (2) thermal equilibration, and (3) final adjustment with the sorbable fluid to the desired pressure.

In the initial bulk fill step, 95% to 105% of the sorbable fluid is added to the vessel, over a period of 2–3 hours.

This initial bulk fill is followed by thermal equilibration, during which the heat of adsorption is dissipated from the sorbent in the storage and dispensing vessel, as well as from the vessel itself. The vessel typically is formed of steel or other metal material of construction, and thus presents a thermal ballast which when heated requires a significant cooling time. The thermal equilibration step typically takes on the order of 20 hours.

After equilibration, the final fill adjustment step is carried out, in which the volume of the sorbable fluid is adjusted, over a period of 1–2 hours, to bring the pressure in the storage and dispensing vessel to a selected pressure level, typically on the order of 650 Torr, for a storage and dispensing system containing sorbable fluids such as arsine, phosphine, silane, boron trifluoride, etc.

In the final fill step, the desired pressure is obtained at fixed temperature fill conditions.

The present invention reduces the time during which the storage and dispensing vessel occupies the fill manifold. Specifically, in the practice of the invention, the storage and dispensing vessels are removed from the fill manifold after completion of the bulk fill step. The removed vessels then are stored in a constant temperature room, environmental control chamber, or other suitable temperature controlled environment until thermal equilibration has been concluded.

By such technique, the fill manufacturing sequence is as follows, in a typical embodiment:

| bulk fill | 95%–105% of the gas added | 2–3 hours |
| removal | transfer to constant temperature environment | 1–2 hours |
| final fill | adjustment to 650 torr | 2–3 hours |

By removing the cylinder from the fill manifold during the thermal equilibration step, the complete fill process can be accomplished in one-third the time formerly required. As a result, the fill manifold is able to produce three times the volume of product storage and dispensing systems, as was formerly possible.

By conducting the thermal equilibration step in a constant temperature room or other controlled ambient environment, the storage and dispensing vessels achieve a known and controllable temperature. Thus, when the final fill step is completed, the final pressure and temperature conditions are much more readily and accurately achieved.

In another aspect of the invention, the sorbable fluid, e.g., fill gas, is added to the storage and dispensing vessel at a precise selected temperature, which may involve chilling or pre-cooling of the gas upstream of such introduction to the vessel. For example, by modifying the fill manifold to incorporate a heat exchanger in the delivery/feed passages of the fill manifold, the sorbable fluid can be pre-cooled to balance the heat generated due to physical adsorption effects during the fill operation.

As a still further aspect of the invention, the sorbable fluid is pre-cooled during the bulk fill step as well as during the final fill step.

As a still further aspect of the invention, the fill manufacturing process of the invention may be carried out using mobile fill manifolds. In such aspect, the storage and dispensing vessels may be loaded on a rack or carriage structure accommodating a multiplicity of such vessels, and connected to a mobile fill manifold also located on the rack or carriage structure. The mobile fill manifold is suitably mounted on the rack or carriage structure as a part of a mobile cart. Such mobile fill manifold, with the associated storage and dispensing vessels in empty (non-filled with sorbable fluid) condition may be placed in a hood or other fill environment, and attached to the main fill manifold. The main fill manifold in turn is coupled with a bulk supply of sorbable fluid.

After suitable cyclic purging or evacuation to remove impurities, if needed, from the sorbent and the interior wall surfaces, the storage and dispensing vessels are filled. When the bulk fill is complete, the mobile manifold is detached from the main fill manifold and the mobile cart is brought to a constant temperature room or other controlled ambient environment, for the thermal equilibration step.

The invention when practiced with such mobile manifold assembly achieves a substantial advance over current practice, in that the main fill manifold is not occupied with vessel installation, thermal equilibration, or vessel removal, which currently occupy a considerable amount of time during the manufacturing process. Thus, the connections to the mobile manifold on the mobile cart are made "off line" and the cart unit is easily and quickly detached from the fill manifold.

The carts thus embody work in progress, in that the mobile manifold on the cart is selectively attachable and detachable from the main fill manifold. After the thermal equilibration step, the mobile manifold is reattached to the main fill manifold for the final fill step. As a result, the productivity of the main fill manifold in the manufacturing plant is markedly increased.

In another aspect, the present invention relates to a method of manufacturing a storage and dispensing system of the aforementioned type, wherein the storage and dispensing vessel and sorbent are cooled or pre-chilled to ameliorate and at least partially avoid thermal effects incident to loading of sorbent fluid on the physical sorbent medium.

The invention in another aspect relates to the maintenance of the storage and dispensing system after loading of the sorbate with sorbable fluid, in a thermal condition which minimizes the occurrence of decomposition and premature desorption of the sorbate fluid.

In other aspects, the invention relates to a method of fill manufacturing of the storage and dispensing vessel, to ameliorate and at least partially avoid thermal effects due to heat adsorption.

The present invention in yet another aspect relates to carrying out active cooling during the fill process to remove heat of adsorption associated with sorption of the sorbable fluid as it is introduced to the storage and dispensing container holding the sorbent media. Removal of the heat of adsorption permits faster filling because higher flow rates can be utilized, and additionally keeps the container cool resulting in less decomposition of thermally-sensitive sorbable fluids such as arsine and phosphine. Further, control of the temperature in the fill operation permits accurate pressure readings to be taken on the storage and dispensing vessel because the internal pressure of the vessel during the fill step will equilibrate to the specified temperature. Such control of temperature is desirable inasmuch as varying temperatures will result in either overfilling or underfilling of the product sorbable fluid in the storage and dispensing vessel.

A closed loop pressure control system is advantageously employed for filling the storage and dispensing vessel with sorbable fluid. Pressure transducers may be employed to monitor the pressure of the sorbable fluid fill manifold, and such pressure transducers desirably are arranged to interact with either a mass flow controller or similar flow throttling device, to controllably carry out the fill operation.

The fill procedure may be carried out by a dosing method, or by a continuous method, as hereinafter described in greater detail.

In another aspect, the invention relates to a fill process involving a blow-off technique for reducing light impurities generated during the fill process.

Another aspect of the invention relates to manufacturing the sorbent-filled storage and dispensing vessel with cycle purging of the vessel, involving alternating vacuum and pressurization with an inert diluent gas, to speed the de-gas/de-water process.

A still further aspect of the invention relates to manufacturing the storage and dispensing vessel with an overfill/blowdown technique, with use of a back pressure regulator and overfilling when a monitored temperature is achieved, using the back pressure regulator to bring the pressure back to a desired level in the sorbable gas fill process.

Other aspects and features of the invention will be more fully apparent from the ensuing disclosure.

DETAILED DESCRIPTION OF THE INVENTION, AND PREFERRED EMBODIMENTS THEREOF

The disclosure of U.S. Pat. No. 5,518,528 issued May 21, 1996 in the names of Glenn M. Tom and James V. McManus, and the disclosure of U.S. patent application Ser. No. 08/650,634 filed May 20, 1996 in the names of Glenn M. Tom and James V. McManus for "FLUID STORAGE AND DELIVERY SYSTEM UTILIZING CARBON SORBENT MEDIUM," hereby are incorporated herein by reference in their entirety.

In the ensuing disclosure, the invention will be described with reference to a gas as the sorbate fluid, however, it will be recognized that the invention is broadly applicable to liquids, gases, vapors, and multiphase fluids, and contemplates storage and dispensing of fluid mixtures as well as single component fluids. In accordance with the teachings of U.S. patent application Ser. No. 08/650,634 filed May 20, 1996 and now issued as U.S. Pat. No. 5,704,965, such fluid may comprise a gas selected from the group consisting of silane, diborane, germane, fluorine, ammonia, phosphine, arsine, stibine, hydrogen sulfide, hydrogen selenide, hydrogen telluride, boron trifluoride, tungsten hexafluoride, chlorine, hydrogen chloride, hydrogen bromide, hydrogen iodide and hydrogen fluoride.

Figure 1:
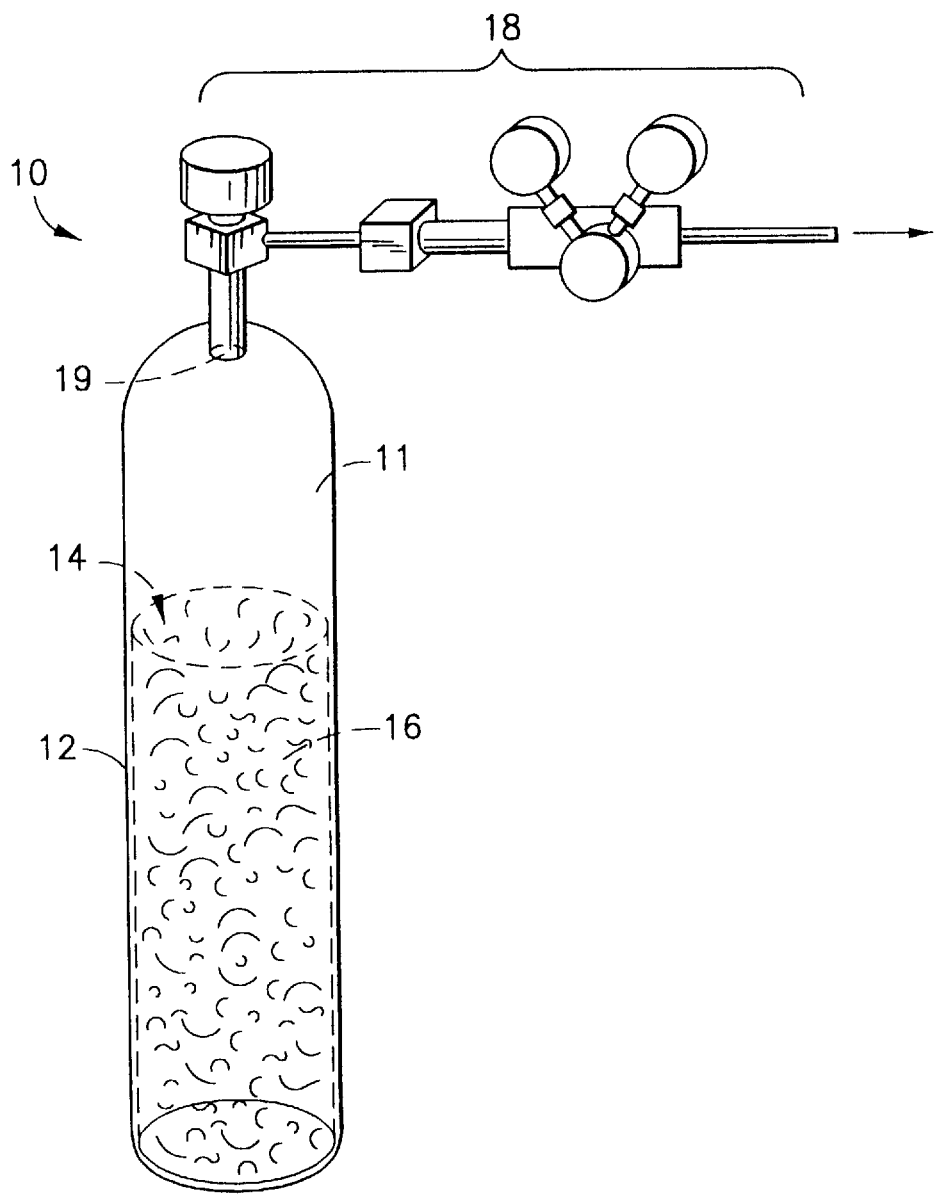
FIG. 1 is a schematic perspective representation of a storage and dispensing vessel and associated flow circuitry according to one embodiment of the invention, as usefully employed in the fill manufacturing process of the invention.

Referring now to the drawings, FIG. 1 is a schematic representation of a storage and dispensing system 10 comprising storage and dispensing vessel 12. The storage and dispensing vessel may for example comprise a conventional gas cylinder container of elongate character. In the interior volume of such vessel is disposed a bed 14 of a suitable sorbent medium 16.

The bed 14 of sorbent medium 16 is disposed in the interior volume 11 of the vessel, and the interior volume communicates with the flow dispensing assembly 18, comprising suitable monitoring and flow regulating means as necessary or desirable in a given end use application of the storage and dispensing system of the invention. The upper end of the cylinder 12 is joined to the fluid dispensing assembly 18 at a port 19 in the cap portion of the vessel. Such port may optionally contain a frit or other filter means (not shown), to preclude entrainment of fine particulates when gas or other fluid is desorbed and dispensed from the interior volume 11 through the flow dispensing assembly 18.

The sorbent medium 16 may comprise any suitable sorptively effective material, having sorptive affinity for the fluid to be stored and subsequently dispensed from the vessel 12, and from which the sorbate is suitably desorbable. Examples include a crystalline aluminosilicate composition, e.g., a micropore aluminosilicate composition with a pore size in the range of from about 4 to about 13 Å, a mesopore crystalline aluminosilicate composition with a pore size in the range of from about 20 to about 40 Å, a carbon sorbent material such as a bead activated carbon sorbent of highly uniform spherical particle shape, e.g., BAC-MP, BAC-LP, and BAC-G-70R bead carbon materials (Kureha Corporation of America, New York, N.Y.), silica, alumina, macroreticulate polymers, kieselguhr, etc.

The sorbent material may be suitably processed or treated to ensure that it is devoid of trace components which may deleteriously affect the performance of the fluid storage and dispensing system. For example, the sorbent may be subjected to washing treatment, e.g., with hydrofluoric acid, to render it sufficiently free of trace components such as metals and oxidic transition metal species.

The present invention permits the fill manufacturing process to be substantially reduced in temporal extent, by providing an off-manifold thermal equilibration step, rather than maintaining the storage and dispensing vessels in coupled relationship to the main fill manifold, as has been prior practice.

The invention thus may be carried out in a fill process as previously described hereinabove, wherein a bulk fill step is carried out to introduce to the storage and dispensing vessel a substantial major fraction e.g., at least 50%, more preferably at least 65%, and most preferably at least 90%, of the total sorbable fluid to be added in the overall fill operation. Such bulk fill step may be carried out with pre-cooling of the sorbable fluid, and/or pre-cooling of the sorbent medium and vessel containing same. Further, it may be desirable to maintain the storage and dispensing vessel containing the sorbent medium, during the fill steps, in contact with a thermal bath or other heat transfer means, by way of maintaining a pre-determined temperature in the vessel during the fill step.

Following the bulk fill step, the storage and dispensing vessel is removed from the main fill manifold, and allowed to thermally equilibrate, to dissipate the heat of adsorption deriving from the bulk fill step.

The storage and dispensing vessel, uncoupled from the main fill manifold, may be disposed in a separate location, chamber, or environment of suitable temperature characteristics, appropriate to the dissipation of heat from the storage and dispensing vessel and sorbent medium therein. For example, a room maintained at sub-ambient temperature may be employed to rapidly equilibrate the storage and dispensing vessel and its contents to an appropriate temperature level.

Alternatively, the storage and dispensing vessel may be simply allowed to thermally equilibrate in an ambient environment, while uncoupled from the main fill manifold.

Regardless of the location and duration of the thermal equilibration step, the main fill manifold, as employed to dispense sorbable fluid in the first instance to the storage and dispensing vessels during their manufacture, may be actively and substantially continuously engaged with such dispensing process, while previously filled vessels are thermally equilibrated at a location remote from such manifold. The thermally equilibrated vessels then may be recoupled to the main fill manifold and subjected to final fill, to dispense the remaining sorbable fluid for adsorption on the sorbent medium, for storage in the vessel until subsequent use.

The final fill may, for example, take 2–3 hours following an initial bulk fill step of similar duration, and off-line thermal equilibration may be carried out in a period of hours in a controlled thermal equilibration environment. Accordingly, it is possible to reduce the manufacturing process time by 50–70% in typical practice, relative to the prior technique in which the storage and dispensing vessel is maintained in coupled relationship to the main fill manifold during the entire manufacturing procedure including thermal equilibration.

Figure 2:
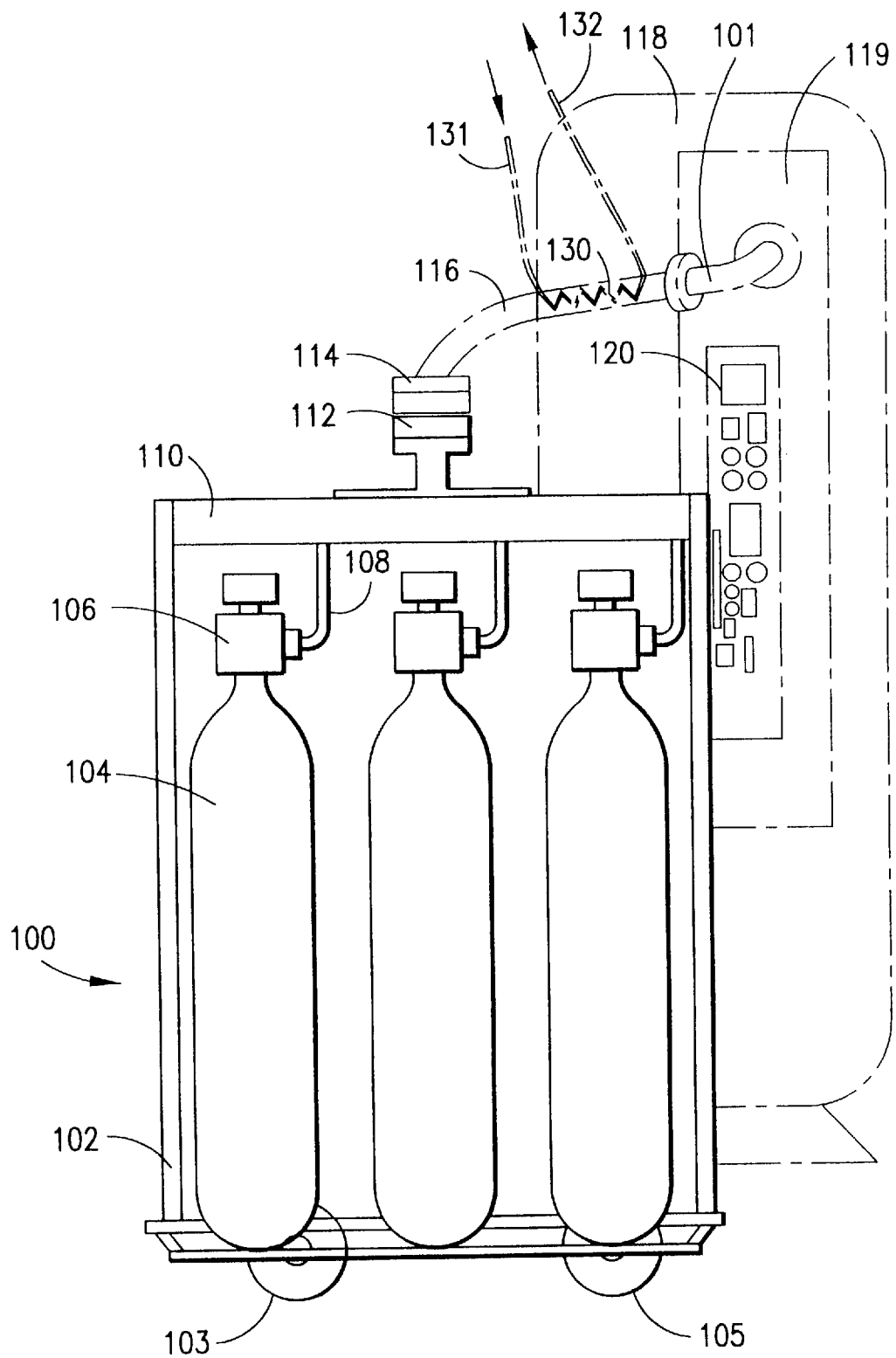
FIG. 2 is a schematic elevational view of a mobile manifold cart assembly, together with a main fill manifold structure and associated bulk container of sorbable fluid as shown in dash-lined representation, illustrating the fill process for manufacturing storage and dispensing systems of a type as shown in FIG. 1.

Referring to FIG. 2, there is shown a mobile fill manifold cart assembly 100. The mobile fill manifold cart assembly 100 comprises a cart 102 having a frame-like construction on which storage and dispensing vessels 104 are mountable as shown, with valve head structures 106 coupled by connecting lines 108 to the mobile fill manifold 110. The mobile fill manifold 110 features mobile fill manifold coupling 112. The cart assembly may be adapted for motive travel, by means of axle-mounted wheels 103, 105 thereon, or by other motive or translational means.

The mobile fill manifold 110 by means of the coupling 112 is detachably securable to the coupling 114 of the main fill manifold 101. The interposed main fill manifold pipe 116 contains a heat exchange passage member 130 which is connected by means of heat exchange inlet line 131 and heat exchange outlet 132 to a source of coolant medium (not shown), for pre-cooling the sorbable fluid dispensed from the main fill manifold 101. The main fill manifold 101 is connected to sorbable fluid source container 118. The main fill manifold 101 is adjustably controllable by control panel 119. The control panel features various regulating and monitoring means 120, for maintaining the temperature, pressure and flow rate of the sorbable fluid within desired limits.

In operation, when the main fill manifold 101 is coupled via main fill manifold pipe 116 and coupling 114 to the coupling 112 of the mobile fill manifold 110, the bulk fill step is carried out to flow sorbable fluid from source container 118 through the manifold main pipe 116 and mobile fill manifold 110, through connecting lines 108, to the storage and dispensing vessels 104 mounted on the cart.

As mentioned, the sorbable fluid may be pre-cooled by heat exchange, utilizing heat exchange member 130 or other suitable heat transfer means or method. Concurrently, or alternatively, the storage and dispensing vessels 104 may be cooled or supplied in the first instance in pre-chilled condition. These cooling provisions serve to balance or offset the heat generated from sorption of the sorbable fluid on the sorbent in the storage and dispensing vessel during the fill sequence.

Subsequent to completion of the bulk fill step, the mobile manifold cart assembly 100 may be disengaged from the main fill manifold 101. Such disengagement is effected by uncoupling the respective coupling members 112 and 114, with appropriate closure of valves or flow control means, to maintain the bulk filled sorbable gas in the interior volume of each of the respective storage and dispensing vessels.

Subsequent to such uncoupling, the main fill manifold cart assembly 100 may be translated to a suitable locus for thermal equilibration. During thermal equilibration, the heat generated by adsorption of the sorbable fluid on the sorbent is dissipated from the respective storage and dispensing vessels.

Subsequent to thermal equilibration, the mobile fill manifold cart assembly may be translated back to the vicinity of the main fill manifold 101 and recoupled, by engagement of coupling members 112 and 114, followed by the final fill step, to complete the filling procedure.

The final fill step may be conducted in any suitable manner, as appropriate to the specific storage and dispensing system and process conditions involved. For example, the final fill step may be carried out in a continuous fashion, or alternatively in a pulsed or step-wise manner, to complete the introduction of sorbable fluid into the interior volume of each of the respective storage and dispensing vessels.

By means of the mobile fill manifold cart assembly, it is possible to simultaneously mountably engage a series of storage and dispensing vessels with the main fill manifold. Although illustratively shown in FIG. 2 as comprising three storage and dispensing vessels, it will be apparent that the mobile fill manifold cart assembly may comprise any other suitable number of storage and dispensing vessels.

Accordingly, the mobile fill manifold cart assembly may be variously configured with a rack, shelf, or stack structure, for mounting the storage and dispensing vessels thereon or therewithin.

It will be appreciated that the mobile fill manifold cart assembly and the appertaining manufacturing fill procedure of the invention achieve a substantial advance in the art, in respect of the increased utilization of the main fill manifold, and the number of storage and dispensing vessels which can be manufactured in a specific amount of time in a process facility using such main fill manifold.

The method and apparatus of the invention permit the thermal equilibration time during the filling of the storage and dispensing vessel to be substantially reduced, employing an environmental chamber to pre-chill and to thermally equilibrate the storage and dispensing vessel.

As discussed hereinabove, the heat effects attendant the sorptive loading of the sorbent material in the manufacture of the storage and dispensing system significantly increase the time required to manufacture the system. In typical practice where the sorbate fluid is loaded on the sorbent in the vessel of the storage and dispensing system, the significant heat of sorption upon introduction of the sorbate gas into the vessel containing the sorbent medium requires long thermal equilibration periods. Minimization of the thermal equilibration times thus can significantly enhance the productivity of the manufacturing facility fabricating such fluid storage and dispensing systems.

Figure 3:
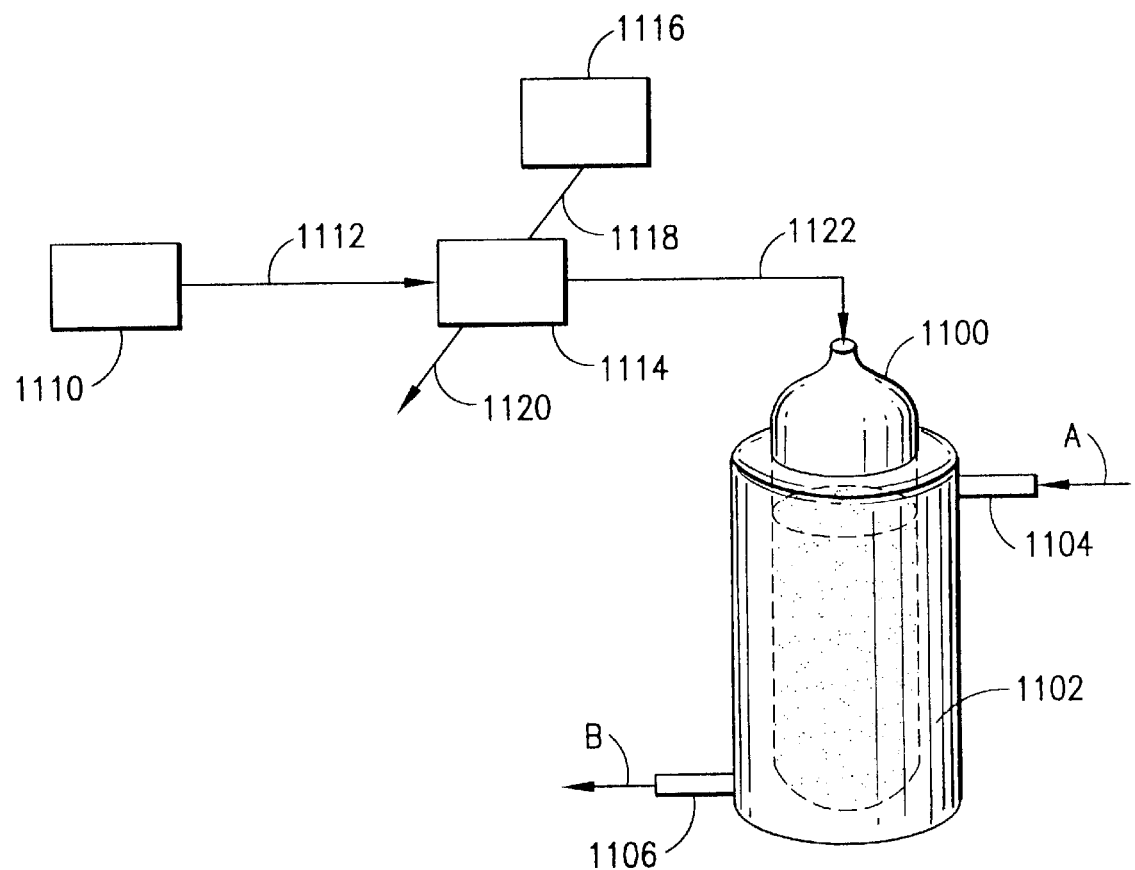
FIG. 3 is a perspective schematic representation of a process system arrangement for chilling the sorbent material, as well as the storage and dispensing vessel, at the time of filling the vessel with sorbent medium.

FIG. 3 is a schematic perspective representation of a manufacturing arrangement for cooling the sorbent material prior to its being introduced to the storage and dispensing vessel, as well as for cooling the storage and dispensing vessel during or prior to such introduction, to abate thermal effects incident to subsequent fill of the storage and dispensing vessel with sorbable gas.

As shown, the storage and dispensing vessel 1100 is disposed in a heat exchange jacket 1102 provided with a heat transfer fluid inlet 1104 for introduction into the heat exchange jacket of a suitable heat transfer fluid in the direction indicated by arrow A. The heat transfer fluid flows through the heat transfer jacket 1102 and is discharged therefrom in discharge line 1106, in the direction indicated by arrow B. The heat exchange is carried out with the heat transfer fluid at appropriately low temperature to chill the storage and dispensing vessel 1100 to an appropriately low temperature accommodating the subsequent heat of adsorption effects incident to the fill of sorbable fluid into the vessel (after introduction thereto of the sorbent material) for sorption on the sorbent material therein.

As also shown in FIG. 3, a source 1110 of a solid physical sorbent medium is provided from which the sorbent is transferred in line 1112. The transfer shown by schematic line 1112 may in practice may embody a moving belt solids conveyor, solids transfer tube, or other transfer or translation means serving to bring the sorbent medium, which may be in any suitable form, such as granules, particles, powders, extradites, cloth or web materials, honeycomb monolith structures, composites, etc., to chilling chamber 1114.

When the sorbent solids are introduced to chilling chamber 1114, a low-temperature vapor from chilling vapor source 1116, e.g., a cryogenic nitrogen cylinder, is transferred in chill vapor conduit 1118 to the chilling chamber 1114, for cooling of the sorbent solid material in the chill chamber and discharge of the vapor from the chilling chamber in line 1120.

Subsequently, the chilled sorbent solids are transferred in line 1122, which again may take the form of a solids conveyor, solids transfer tube, etc., to the storage and dispensing vessel 1100.

By the arrangement shown, the sorbent solids can be chilled to suitable low temperature, contemporaneous with chilling of the storage and dispensing vessel, so that the storage and dispensing vessel once filled with the cooled sorbent, can accommodate introduction of the sorbable fluid to the vessel. As a result, heat adsorption effects are ameliorated and can even be fully eliminated when appropriate chill temperatures are utilized.

By heat balance determination and simple empirical tests, the optimum chilling temperatures for the sorbent and for the storage and dispensing vessel can be readily determined by the skilled artisan without undue effort, to determine the chilling conditions which thermally match or correlate to the thermal effects of heat of adsorption when the sorbable fluid is introduced to the bed of sorbent medium in storage and dispensing vessel 1100.

Figure 4:
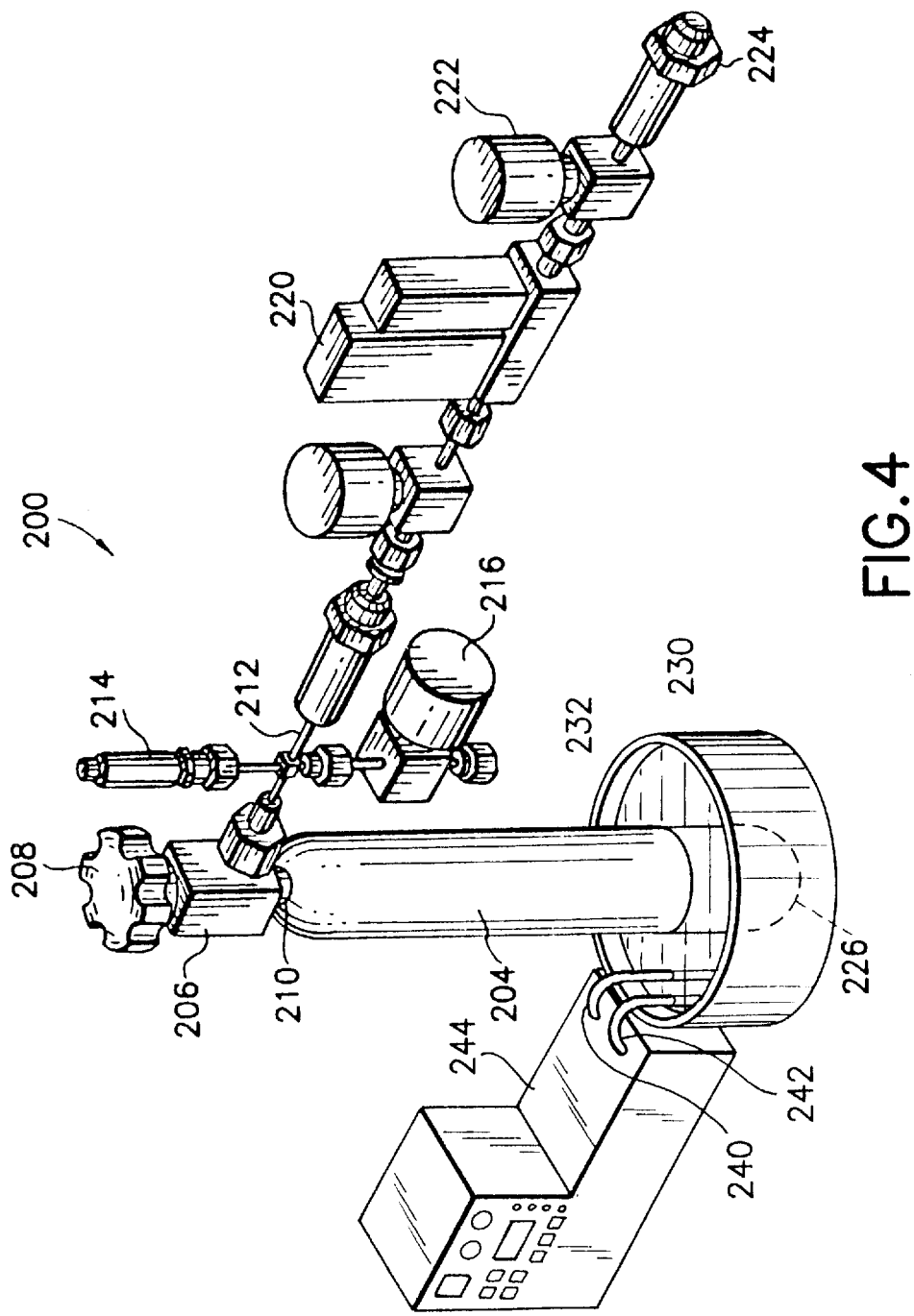
FIG. 4 is a perspective schematic view of a constant temperature bath storage arrangement for a storage and dispensing system according to the invention, in one embodiment thereof.

FIG. 4 is perspective schematic view of a storage and dispensing system 200 according to one embodiment of the invention, comprising a storage and dispensing vessel 204 which is maintained in a constant temperature bath at low temperature, to minimize decomposition of the sorbate gas in the storage and dispensing vessel, and to minimize heat effects generally.

As shown, the storage and dispensing system 200 comprises a storage and dispensing vessel 204 which is joined at its upper portion to a valve head 206 comprising part of a dispensing assembly including manual actuator 208 for the head valve on the cylinder. The head valve is joined by means of coupling 210 to a dispensing conduit 212 having disposed therein a pressure transducer 214, an inert purge unit 216 for purging the dispensing assembly with inert gas, a mass flow controller 220 for maintaining constant flow rate through the dispensing conduit 212 during the dispensing operation, and a filter 222 for removing particulates from the dispensed gas prior to its discharge from the dispensing assembly.

The dispensing assembly further comprises a coupling 224, for mateably engaging the dispensing assembly with downstream typing, valving, or other structure associated with the locus of use of the desorbed fluid.

The lower portion 226 of storage and dispensing vessel 204 is reposed as shown in a container 230 of heat ballast fluid 232. The heat ballast fluid is circulated by means of conduits 240 and 242 through the chiller assembly 244 which serves to remove heat from the circulated thermal ballast fluid and to maintain the thermal ballast fluid in container 230 at a constant selected temperature, which may be on the order of 0° C., or at other convenient temperature which enhances the performance and service life of the storage and dispensing system.

A system such as is schematically shown in FIG. 4 may be utilized in practice to maintain the sorbent in storage and dispensing vessel 204 at a sufficiently low temperature so that significant decomposition of sorbate fluid does not take place within the vessel 204, and so that no resorption heat effects are experienced as a result of desorption which otherwise might occur due to upward temperature fluctuations, in the storage and/or use of the system.

In the case of arsine gas sorbed on a zeolite or carbon sorbent material, it has been found generally advantageous to maintain the storage and dispensing system at a temperature not exceeding about 0° C., to dramatically reduce the decomposition rate of the hydride gas from the decomposition levels which would otherwise be experienced if the storage and dispensing system were maintained at ambient room temperature.

The foregoing thermal constraint of low temperature maintenance of the storage and dispensing system is based on an analysis of the rate constants for arsine decomposition between 0° C. and 30° C., to determine fitting parameters for the Arrhenius equation. The Arrhenius equation can be used to determine optimum storage and filling temperatures for the storage and dispensing system in the broad practice of the present invention.

By way of specific background, in systems utilizing arsine as the sorbable fluid on a sorbent such as zeolite or carbon, the storage and dispensing system will build pressure over time due to decomposition of arsine to the elements.

The decomposition reaction set out below, generates 1.5 moles of $H_2$ per mole of arsine $$AsH_{3(g)} \text{ - - -} > AS_{(s)} + 1.5\ H_{2(g)}$$

Zeolite 5A is taken as the sorbent in the ensuing discussion for purposes of analysis.

Since hydrogen is not appreciably adsorbed by the zeolite and there is a net increase of gas molecules in the system, arsine decomposition results in a pressure rise within the gas cylinder. The pressure rise associated with this decomposition reaction may result in significant positive cylinder pressures which are undesirable in many applications.

Since arsine alone is endothermic (with respect to the elements As and $H_2$), this observation is not surprising and may be exacerbated by reaction and/or catalysis with various zeolite functionalities.

In order to understand the decomposition process a series of experiments were conducted to quantify the decomposition rate of arsine on zeolite. The experimental focus was to determine reaction rates as a function of temperature. Reaction rates were obtained for the decomposition reaction between 0° C. and 30° C.

The decomposition rate was measured by observing the pressure rise in a test cylinder of zeolite over time. Decomposition rates were obtained at 2.3° C., 23° C. and 30° C. The temperature was maintained constant by immersing the cylinder into a Dewar containing a 50/50 water and ethylene glycol mixture supplied from a Neslab constant temperature circulating bath. Pressure and temperature data were logged using a Fluke data bucket and computer. The data were taken over a 3 day period to assure proper signal-to-noise ratio and appropriately determine the order of the reaction. At 2.3° C., the pressure rise rate was about 1 Torr per day, requiring a least a 3 day measurement in order to exceed the noise of the system. Since the reaction rate was relatively slow, it took about 3 days to verify reaction order.

At 2.3° C., 23° C. and 30° C., the reaction appeared to be zero order as the rate of pressure rise was constant over the 3 day monitoring period. Therefore, the rate equation for a zero order reaction was used to determine the rate constant at the three different temperatures:

$$Kt = C_0 - C$$

wherein:
K=the rate constant
t=time in seconds
C=concentration at time t and
$C_0$=the initial concentration at t=0

The rate data for the experiment is shown in the table below:

| Temperature (°K) | Pressure Rise Rate (torr/day) | Rate Constant K(s⁻¹) | LN K (s⁻¹) |
|---|---|---|---|
| 275.45 | 1 | 2.26 E-10 | −22.2 |
| 296.15 | 5.6 | 1.26 E-9 | −20.5 |
| 303.15 | 10 | 2.26 E-9 | −19.9 |

The Arrhenius equation was employed to describe the effect of temperature on rate constants using the above data to obtain the activation energy and frequency factor for the Arrhenius equation.

The Arrhenius equation is given below:

$$K = Ae^{-E_a/RT}$$

where:
K=the rate constant as a function of Temperature (T)
A=the preexponential factor or frequency factor
$E_a$=the activation energy
R=the gas constant=1.987 cal $K^{-1}$ $mol^{-1}$ and;
T=the temperature in °K
In logarithmic form, the Arrhenius equation becomes:

$$Ln\ K = Ln\ A - E_a/RT$$

Therefore, a plot of Ln K vs. 1/T must be a straight line in order for the Arrhenius equation to be satisfied.

Figure 5:
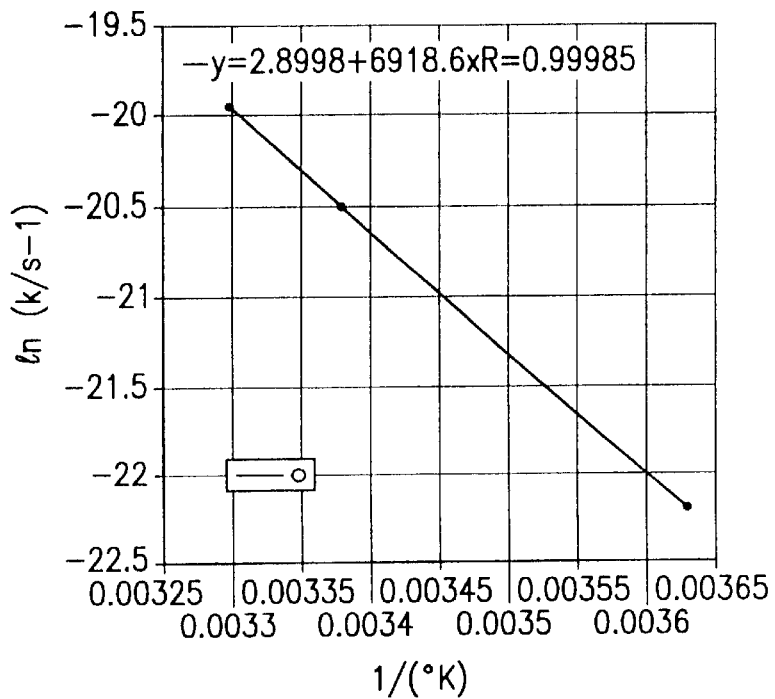
FIG. 5 is an Arrhenius plot for arsine decomposition on zeolite sorbent.

Plotting the data from the above table in this fashion does indeed generate a straight line as shown in FIG. 5 hereof.

From the plot of FIG. 5, the two fitting parameters A and Ea can be determined from the y-intercept and the slope respectively.

$$A = 4.3\ E+9$$

$$Ea = 13.75\ Kcals/mole$$

Thus, the rate constant for the decomposition of arsine on zeolite as a function of temperature can be obtained using the Arrhenius equation as follows:

$$K = 4.3 \, E{+}9(e^{-13.75/rt})$$

Figure 6:
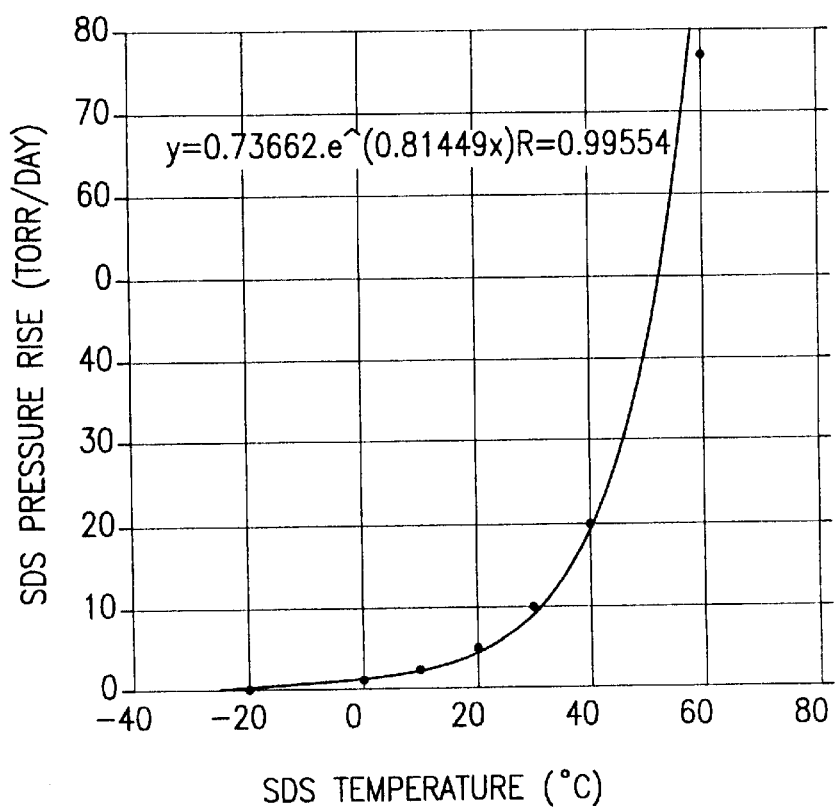
FIG. 6 is a graph of pressure rise in an illustrative storage and dispensing system, as a function of temperature of the system.

Assuming the above Arrhenius equation holds true at other temperatures a plot of pressure rise versus temperature was constructed as shown in FIG. 6.

As can be seen from the graph, keeping the storage and dispensing system cold, e.g., below 0° C., will dramatically reduce the decomposition rate.

The foregoing analysis yields the conclusion that during filling of the storage and dispensing cylinders, it is highly advantageous to chill the storage and dispensing vessel, e.g., in dry ice, to compensate for heat of adsorption during the filling process, and/or to pre-chill the sorbent and/or vessel.

Additionally, the analysis shows that it is highly desirable to store the storage and dispensing system at a temperature not exceeding about 0° C.

Figure 7:
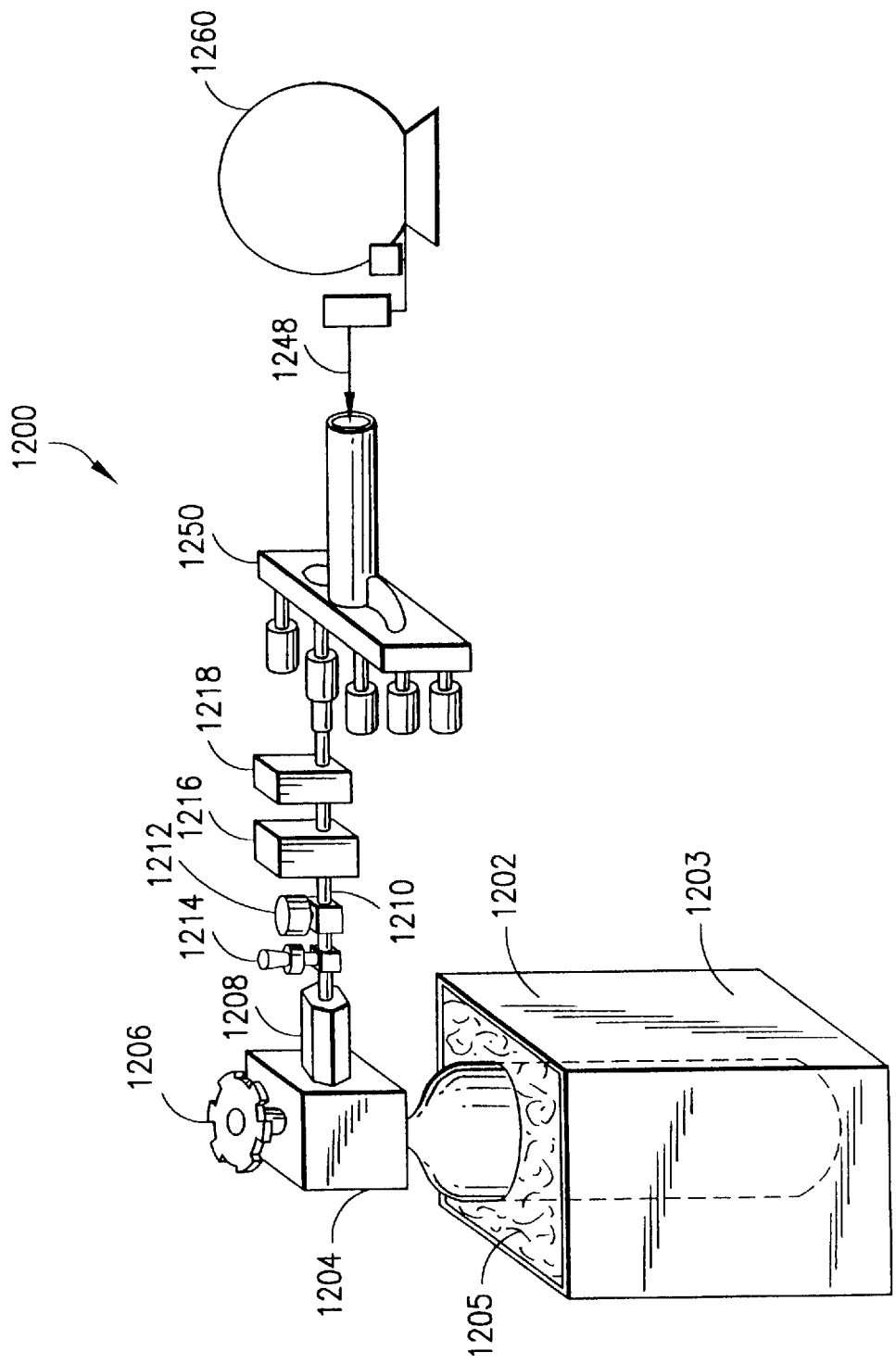
FIG. 7 is a perspective schematic view of a fill system according to one embodiment of the invention.

FIG. 7 is a perspective schematic view of a fill system 1200 according to one embodiment of the present invention.

As shown, the fill system is arranged for filling of a storage and dispensing vessel 1202 as previously described herein. The vessel 1202 is provided with a valve head 1204 comprising manual valve actuating handle 1206. The valve head 1204 comprises a coupling 1208 to which is joined a fill conduit 1210, containing a fill gas valve 1212, a pressure transducer 1214, a mass flow controller 1216, an electronic pressure regulator 1218, and such other instrumentation and control elements as may be desired for controllably filling the cylinder with gas, so that the sorbent in vessel 1202 sorptively takes up such gas in a controlled and efficient manner. The gas feed conduit 1210 is coupled to a fill manifold 1250, which in turn is joined by line 1248 to a bulk source 1260 of the sorbable gas.

The cylinder constituting the storage and dispensing vessel 1202 is, as shown, disposed in a container 1203 which may be filled with dry ice 1205 or other coolant agent. Alternatively, the cylinder may be disposed in a cooling jacket to maintain low temperature of the sorbent material in the cylinder during the fill operation.

Such active cooling during the fill process removes the heat of adsorption caused by sorptive take-up of the gas being loaded on to the sorbent medium in storage and dispensing vessel 1202. Removal of the heat of adsorption permits faster filling because high flow rates can be utilized, and keeps the cylinder cool, resulting in less sorbable fluid decomposition in the storage and dispensing vessel.

Additionally, control of the temperature of the storage and dispensing vessel during the fill operation will permit unambiguous pressure readings to be monitored by the pressure transducer 1214, because the cylinder pressure will equilibrate to the selected temperature. This is necessary since varying temperatures will lead to either overfilling or underfilling of the product.

A closed loop pressure control system for filling the cylinders is advantageous, in which the pressure transducer 1212 monitoring the pressure of the manifold 1250 interacts with the mass flow controller 1216, or other flow regulating device.

For accurate pressure measurement, the storage and dispensing vessel must be fully equilibrated to a specified temperature. The specified temperature may for example in the case of arsine gas, as the sorbable fluid to be loaded into the sorbent-containing storage and dispensing vessel, be on the order of 70° F.±2° F. If the selected temperature condition is not met, the storage and dispensing vessel will be either overfilled or underfilled if pressure is used as a determinant for filling end point. Pressure should be used as a determinant in order to characterize the product by a specified pressure, as is desirable in the commercial sale and distribution of the storage and dispensing system of the invention. The final pressure reading is achieved when the storage and dispensing vessel, including its sorbable gas-loaded sorbent, is fully equilibrated with its ambient surroundings.

Relative to heat of adsorption effects, it is desirable that the amount of heat removed from the cylinder during the fill operation be balanced with the amount of heat generated by adsorptive heat generation, since otherwise overfilling can result if a continuous feed method is employed.

Cooling may be affected in the fill process by cooling the sorbable fluid prior to its introduction to the storage and dispensing vessel, by pre-cooling the cylinder, before the fill operation commences, and/or by active cooling of the cylinder during the fill sequence, as illustratively shown in FIG. 7.

Figure 8:
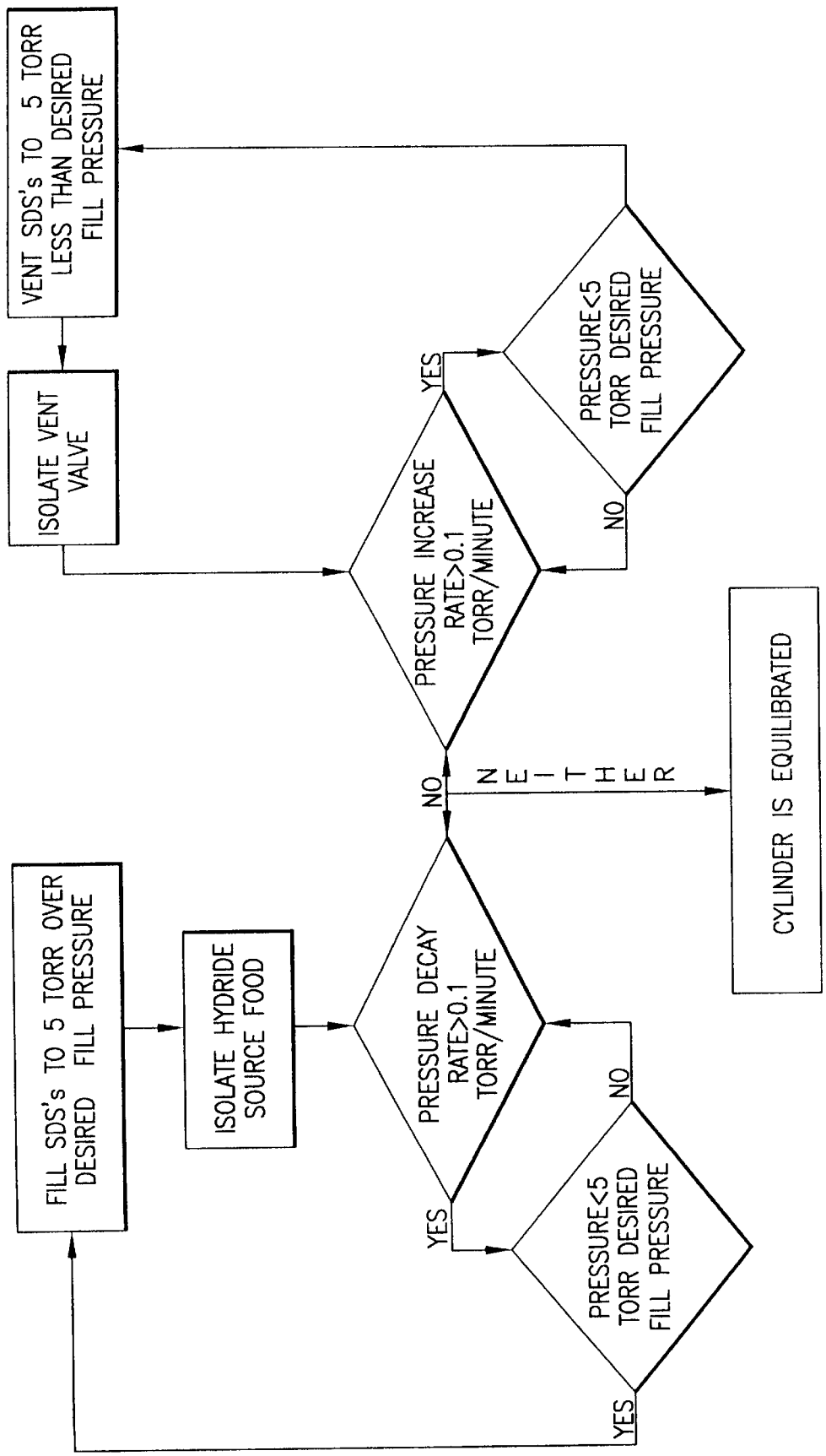
FIG. 8 is a flow chart for a fill operation in accordance with one embodiment of the invention.

Dose filling of the storage and dispensing vessel may be carried out in a system such as schematically shown in FIG. 7, comprising the procedure of the flow chart of FIG. 8. Such dosing procedure permits automated equilibration to a predetermined pressure value.

As shown in FIG. 8, wherein the storage and dispensing vessel is referred to as "SDS," and the sorbable fluid is identified as "Hydride Source Feed," the hydride feed gas source is isolated after the storage and dispensing vessel is filled to a pressure level of 5 Torr over the desired fill pressure, and the pressure to k rate then is determined. If the pressure to k rate is greater than 0.1 Torr/minute, and the pressure is less than 5 Torr from the desired fill pressure, then the storage and dispensing vessel is overfilled by 5 Torr over the desired fill pressure, followed by re-isolation of the hydride feed source, and re-measurement of the pressure to determine the pressure decay rate and the pressure difference from the desired fill pressure. If the pressure decay rate is less than 0.1 Torr/minute and the pressure is within 5 Torr of the desired fill pressure, then the isolation of the hydride source feed loop is terminated.

Next, the vent valve of the fill system is isolated, and the pressure increase rate of the storage and dispensing vessel is determined. If the pressure increase rate is greater than 0.1 Torr/minute, and the pressure difference from the desired fill pressure is greater than 5 Torr, then the vent valve is actuated to vent the cylinder to a pressure level of 5 Torr or less than the desired fill pressure, followed by vent valve isolation, and monitoring of the pressure increase rate. When the pressure is within 5 Torr of the desired fill pressure, and the monitored pressure increase rate is less than 0.1 Torr/minute, then the cylinder is determined to be pressure and temperature equilibrated, and the fill operation is terminated.

The dosing method described above may be employed to fill up to or beyond the actual shipping pressure of the storage and dispensing vessel. Overfilling may be necessary in some applications to permit blow-down of light gases that accumulate in the storage and dispensing vessel during the filling process.

Overfilling by pressure levels on the order of 10 psig relative to the desired fill pressure value, with subsequent depressurization to the desired fill pressure, results in a dramatic reduction of light impurities (hydrogen, nitrogen, CO, methane, oxygen).

In lieu of the dose filling method described hereinabove, the storage and dispensing vessel may be filled by a continuous fill method. The continuous fill method is carried out with maintenance of a constant upstream pressure relative to the storage and dispensing vessel, that is equal to the desired fill pressure.

Referring again to FIG. 7, the upstream pressure of the sorbable gas being filled in the storage and dispensing vessel containing sorbent, is controlled by the electronic pressure regulator 1218, which may be of any suitable commercial type, e.g., an MKS 1600 electronic pressure regulator (MKS Instruments, Inc.). The electronic pressure regulator is set to the desired fill pressure.

The mass flow controller 1216 is placed downstream from the electronic pressure regulator to maintain a constant flow rate. The mass flow controller may be of any suitable commercially available type, e.g., an MKS 1400 series mass flow controller (MKS Instruments, Inc.).

At a pressure differential of about 50 Torr (i.e., when the storage and dispensing vessel pressure is within about 50 Torr of the delivery pressure), the mass flow controller will not deliver suitable flow. At this point, the mass flow controller may be bypassed, if necessary, and the flow of the sorbable gas may be diverted through a high conductance path (not shown in FIG. 7) until equilibration of the storage and dispensing vessel has been achieved. The sorbable gas will continually bleed into the storage and dispensing vessel until the vessel is thermally equilibrated. This is a relatively slow part of the fill process, however the removal of heat from the storage and dispensing vessel during such fill process will accelerate the fill process.

The fill operation may be conducted with controlled blow-off of sorbable gas from the storage and dispensing vessel. In this mode of fill operation, the storage and dispensing vessel is overflowed to approximately 10–20 psig, and then controllably bled down in pressure to the final fill pressure e.g., which may be on the order of 625 Torr at 70° F. for an illustrative arsine storage and dispensing system. The control procedure is reverse to that of the filling procedure, as described in the dose filling procedure hereinabove. The dose fill procedure provides a method for controlled blow-down which permits automatic equilibration of the manifold. Alternatively, a closed loop pressure control may be used instead of the dosing method.

In the cylinder filling procedure, light impurities may be concentrated in the interstitial volume, since they are not adsorbed. Because many cylinder-volumes of gas are typically added, there is a large concentration effect on non-adsorbed impurities. During filling, low ppm levels of impurities such as $N_2$, CO, $CH_4$, etc. will concentrate many-fold as gas is added to the cylinder.

In the blow-down procedure, light impurities generated during the fill process are significantly reduced. The blow-down procedure is carried out with a mass flow controller that is closed loop controlled with a pressure transducer, utilizing a fill system of the general type schematically shown in FIG. 7. An electronic back pressure regulator can also be used to effectuate blow-down processing in the manufacture of sorbable gas-containing storage and dispensing systems.

It will be recognized that the FIG. 7 fill system has been schematically illustrated without reference to detailed features of instrumentation and automatic control, which may be variously implemented as will be readily apparent in a ready manner, to carry out the fill operation in the desired manner.

As a specific example of the present invention in one aspect thereof, the heat of adsorption (10–20 Kcals/mole) generated during gas fill of the storage and dispensing cylinder typically causes the cylinder contents (adsorbent and gas) to heat in excess of 40° C. Associated with this temperature rise is a pressure rise of about 0.03 atmospheres (25 torr) per °C. In order to assure a final fill pressure of approximately 1 atmosphere at 21° C., it is necessary to allow the cylinder to thermally equilibrate to room temperature (21° C.). The time associated with this cool-down is unacceptably long, typically >6 hours for 4" (diameter)×14" (height) cylinders, and >10 hours for 6"(diameter)×18" (height) cylinders, which are typical production size storage and dispensing cylinders. The relatively long period of time for equilibration is due to the poor transfer of heat out of the cylinder which heretofore was accomplished primarily by free air convection. Another factor contributing to the poor heat transfer is the relatively low thermal conductivity of the adsorbent.

In order to improve the speed of the cylinder filling process, methods to improve the conductive (molecular) and convective heat transfer rates must be employed.

In accordance with the present invention, the conductive and convective heat transfer rates are significantly increased utilizing an environmental process chamber. Convective heat transfer is improved since the chamber provides forced convective cooling of the cylinders using a high velocity circulation of chilled air. Forced convection of air results in an order of magnitude improvement in heat transfer of free convection. Additionally a much larger ΔT in the forced cooling air is possible when the cooling air is cooled via a refrigeration system. This results in a higher heat transfer rate since the rate is proportional to the cooling fluid temperature in accordance with Newton's Law of Cooling:

$$q=hA\Delta T$$

where q=the rate of convective cooling;
A=the area of the surface being cooled; and
ΔT=the temperature difference in °F. between the surface and the cooling fluid.

Since storage and dispensing cylinders dissipate most of their heat via convection from the surface of the cylinder to the surrounding air, a significant improvement in process throughput can be realized using the environmental chamber. Conductive transfer rates are concurrently improved due to the lower temperature processing.

By way of specific example, fluid storage and dispensing cylinders may be cooled using an environmental chamber such as the model SE-1000 chamber manufactured by Thermotron Industries. Such chambers provide highly uniform processing temperatures. Such temperature uniformity is critically important since typically a large number of the storage and dispensing cylinders are contained within the environmental chamber and each cylinder must share identical temperature profiles during processing. The temperature uniformity of the Thermotron chamber is ±1° C. at any point and the control accuracy is ±0.5° C. over its entire temperature range.

A typical chamber of the foregoing type can provide processing temperatures over the range of −40° C. to 180° C. This temperature variability is also beneficial since the chamber can also be used to heat the cylinders for degassing thereof, which requires a temperature on the order of 180° C.

This results in an additional time savings as both degas and filling are performed in the same chamber resulting in less handling of the cylinders.

Since forced convective cooling has been employed, it is efficient to pre-chill the cylinders to a temperature that exactly offsets the exotherm produced by the adsorption process. For example, if the ΔT within the cylinder after filling is 25° C., the cylinder would be pre-chilled to −4° C. prior to filling to offset the temperature rise. Therefore at the end of the fill process the cylinders would be at the final equilibration temperature of 21° C. The total fill time is roughly the time it takes to add the requisite amount of gas to the cylinders. Using just free air convective cooling, the total fill time is equal to the time it takes to add the gas, plus the time it takes to thermally equilibrate the cylinders to 21° C. By pre-chilling the cylinders in the environmental chamber, the fill time is reduced to 2 hours, versus more than 10 hours for free air convective cooling only.

In order to assure that the final cylinder target pressure has been reached, it is necessary to allow the cylinders to thermally equilibrate to 21° C. This is easily accomplished using the Thermotron environmental chamber which can control to 21° C.±0.5° C. The effect of final equilibration temperature on cylinder pressure is shown in FIG. 9 for cylinders being filled with boron trifluoride gas.

Figure 9:
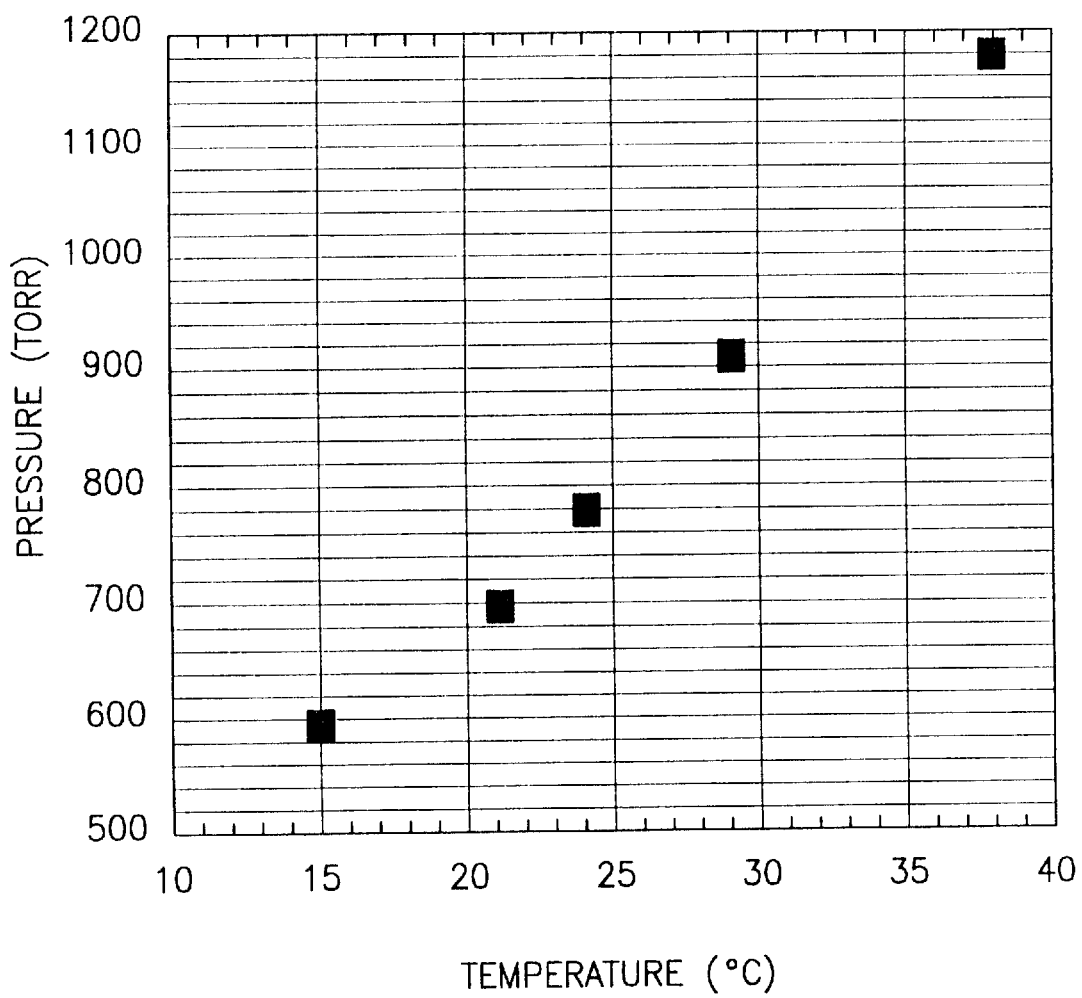
FIG. 9 is a plot of pressure as a function of temperature showing the effect of fill temperature on final pressure of the storage and dispensing cylinder.

It is clear from FIG. 9 that normal room temperature variation (±3° C.) will cause a wide variability in final fill pressure. The ±0.5° C. temperature variation achievable with the environmental chamber will result in a pressure variation of only ±5 torr whereas the room temperature variation will cause pressure swings as high as ±100 torr. Such room temperature variability is unacceptable as determination of process endpoint becomes difficult and time consuming.

A complete cylinder fill cycle including the degas operation can be completed in a 24-hour cycle. If the cylinders were not pre-chilled, the resulting process would be in excess of 36 hours which would limit the number of runs per week to about 3 instead of 5.

The process steps for filling the storage and dispensing cylinders in an illustrative embodiment of the present invention are as follows:

1. Connect cylinders to degas/fill header manifold inside environmental chamber.
2. Evacuate cylinders to 1 torr using dry pump.
3. While evacuating, ramp environmental chamber temperature to 180° C. to accelerate desorption of atmospheric gases contained within the adsorbent.
4. After removal of the atmospheric contaminants, chill the cylinders to −4° C.
5. After reaching −4° C., turn off the refrigeration system.
6. Add 95%–98% of the required fill gas. This takes about 1.5 hours. The cylinder will begin to warm from −4° C. to 21° C. as the heat from the adsorption process is generated.
7. Set environmental chamber to 21° C. and allow the cylinders to thermally equilibrate to 21° C. Equilibration is detected by observing the pressure which should approach a constant value once equilibration is reached.
8. Add the remaining 2–5% of fill gas through an automated pressure controller in order to reach the target fill pressure at 21° C.
9. The final target pressure is reached when no further fill gas is added to the cylinders.

Figure 10:
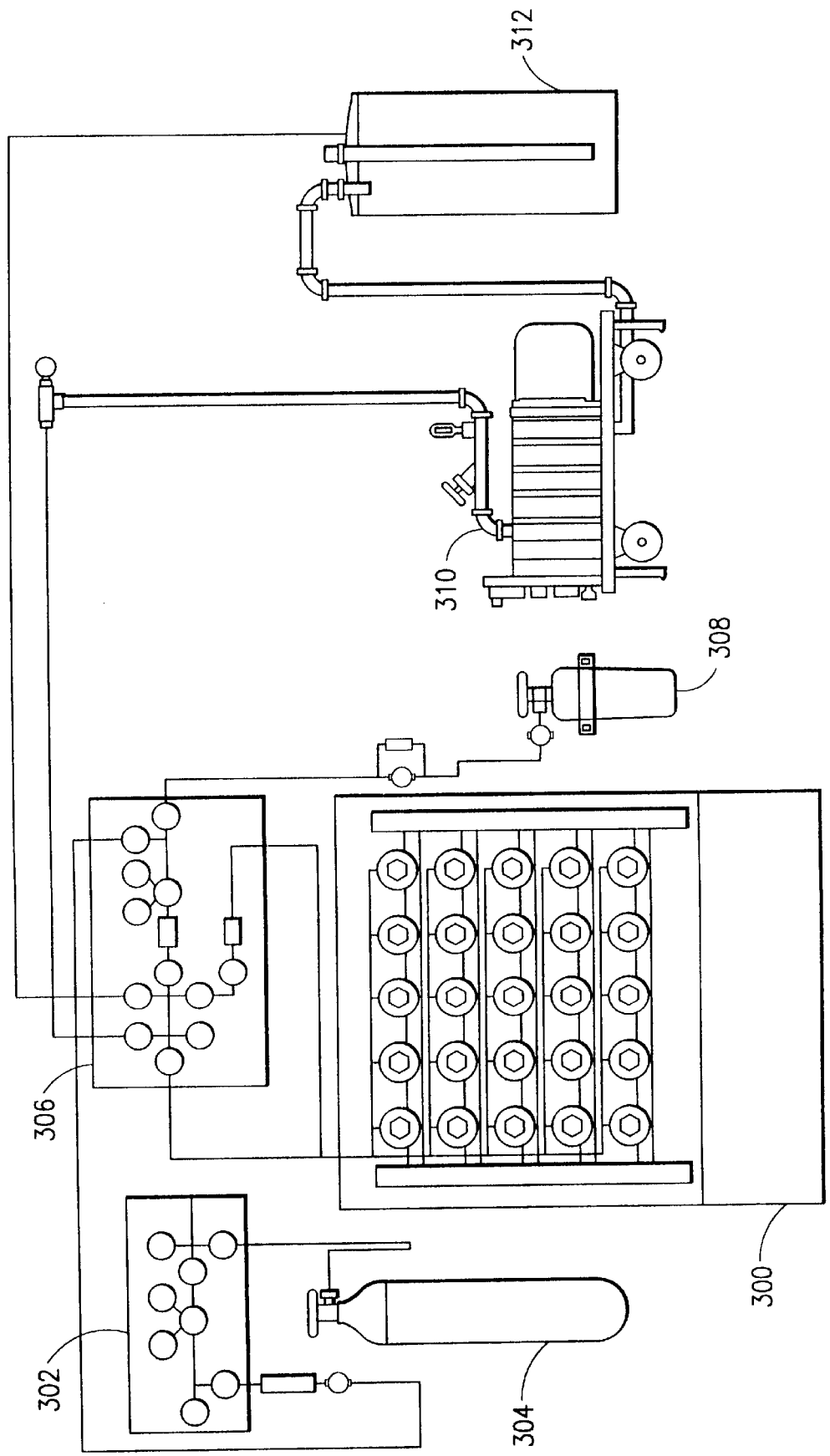
FIG. 10 is a schematic representation of a storage and dispensing cylinder manufacturing process system including an environmental chamber, according to one embodiment of the invention.

In an illustrative embodiment of the manufacturing process system, shown in FIG. 10, the major components of the fill system usefully employed to carry out the foregoing method are as follows:

1. Environmental Chamber 300
2. Pressure and flow control manifold 306 which controls the feed of fill gas from a high pressure source tank 308
3. Purge gas manifold 302 and inert purge gas source 304 (high purity helium, argon or nitrogen)
4. Vent scrubber 312
5. Dry Pump 310

Thus, while the invention has been shown and described with reference to specific features, aspects and embodiments herein, it will be appreciated that the invention is susceptible of a wide variety of other embodiments, features and implementations consistent with the disclosure herein, and the invention is therefore to be broadly construed and interpreted, within the spirit and scope of the foregoing disclosure.

What is claimed is:

1. A method of manufacturing a fluid storage and dispensing vessel containing sorbent material for holding a sorbable fluid, for on-demand dispensing of the fluid in the use of the vessel, said method comprising filling the vessel with sorbent material, and coupling the vessel containing sorbent material with a source of sorbable fluid for flowing of sorbable fluid into the vessel for sorption on the sorbent material in the vessel and retention of the fluid therein, wherein the vessel is bulk filled with an initial quantity of fluid, and then stored at reduced temperature conditions in relation to the fluid fill temperature condition, for sufficient time to thermally equilibrate the vessel containing the sorbent filled with the initial quantity of fluid to the reduced temperature conditions, and following thermal equilibration, completing the fill of the vessel with said fluid.

2. A method according to claim 1, wherein the source of sorbable fluid is a fill manifold joined to a supply of the sorbable fluid, and arranged for connection with the vessel.

3. A method according to claim 2, wherein the fill manifold is an automatic fill manifold.

4. A method according to claim 1, wherein the reduced temperature conditions are provided by an environmental chamber of a size and character for holding the vessel at the reduced temperature conditions.

5. A method according to claim 1, wherein the vessel is maintained on a motive carrier structure for flowing of absorbable fluid into the vessel, to accommodate removal of the vessel from the source of sorbable fluid, and transport to a different thermal environment.

6. A method according to claim 5, wherein the motive carrier structure comprises a mobile cart having a manifold connection assembly thereon for interconnecting the vessel with the sorbable fluid source.

7. A method according to claim 1, wherein the vessel is subjected to active cooling during the flow of fluid into the vessel, to dissipate the heat of sorption of the fluid contacting the sorbent material.

8. A process according to claim 1, comprising cycle purging of the vessel prior to the fluid flow to degas the vessel and sorbent material therein.

9. A method according to claim 1, wherein the vessel is subjected to overfill and blowdown conditions during the flow of fluid into the vessel, to dissipate the heat of sorption of the fluid contacting the sorbent material.

10. A method according to claim 1, wherein the fluid comprises a gas selected from the group consisting of hydride gases, halide gases and gaseous organometallic Group V compounds.

11. A method according to claim 1, wherein the fluid comprises a gas selected from the group consisting of silane, diborane, germane, fluorine, ammonia, phosphine, arsine, stibine, hydrogen sulfide, hydrogen selenide, hydrogen telluride, boron trifluoride, tungsten hexafluoride, chlorine, hydrogen chloride, hydrogen bromide, hydrogen iodide, and hydrogen fluoride.

12. A method according to claim 1, wherein the sorbent material is selected from the group consisting of carbon materials, crystalline aluminosilicate materials, silica, alumina, macroreticulate polymers and kieselguhr.

13. A method according to claim 1, wherein the sorbent material comprises an activated carbon material.

14. A method according to claim 1, wherein the storage and dispensing vessel is of elongate form.

15. A method of manufacturing a fluid storage and dispensing vessel containing sorbent material for holding a sorbable fluid, for on-demand dispensing of the fluid in the use of the vessel, said method cornprising filling the vessel with sorbent material, and coupling the vessel containing sorbent material with a source of sorbable fluid for flowing of sorbable fluid into the vessel for sorption on the sorbent material in the vessel and retention of the fluid therein, wherein the sorbable fluid is chilled prior to flow thereof into the vessel, to moderate heat of sorption effects during the flow of sorbable fluid into the vessel, and sorption of the sorbable fluid on the sorbent material in the vessel.

16. A method of manufacturing a fluid storage and dispensing vessel containing sorbent material for holding a sorbable fluid, for on-demand dispensing of the fluid in the use of the vessel said method comprising filling the vessel with sorbent material, and coupling the vessel containing sorbent material with a source of sorbable fluid for flowing of sorbable fuid into the vessel for sorption on the sorbent material in the vessel and retention of the fluid therein, wherein the vessel is chilled prior to flow of sorbable fluid thereinto, to oppose the heat of sorption heating of the vessel during the flow of sorbable fluid into the vessel, and sorption of the sorbable fluid on the sorbent material in the vessel, wherein the vessel is further cooled during the flow of sorbable fluid into the vessel.

17. A system for manufacturing a fluid storage and dispensing vessel containing a sorbent material having sorptive affinity for the fluid, wherein the vessel is loaded with the sorbent material, and the fluid is flowed into the vessel for sorption on the sorbent material and subsequent retention in the vessel, said system comprising a manifold arranged in flow communication with a source of fluid, with means for controlling the pressure and temperature conditions of the flow of fluid into the vessel.

18. A system according to claim 17, further comprising a mass flow controller for controlling the rate of flow of fluid into the vessel consistent with the controlled pressure and temperature conditions of the flow of fluid into the vessel.

* * * * *

UNITED STATES PATENT AND TRADEMARK OFFICE
CERTIFICATE OF CORRECTION

PATENT NO : 5,837,027
DATED : November 17, 1998
INVENTOR(S) : Olander et al.

It is certified that error appears in the above-identified patent and that said Letters Patent is hereby corrected as shown below:

Column 1, line 49: "heatingjacket" should be --heating jacket--

Column 3, line 9: "INVETION" should be --INVENTION--

Column 10, line 2: "j acket" should be --jacket--

Signed and Sealed this

Twenty-third Day of March, 1999

Attest:

Q. TODD DICKINSON

Attesting Officer

Acting Commissioner of Patents and Trademarks